US007876441B2

(12) United States Patent
Fejfar

(10) Patent No.: US 7,876,441 B2
(45) Date of Patent: Jan. 25, 2011

(54) CONTROL STATION FOR A PRINTING PRESS

(75) Inventor: Florian Fejfar, München (DE)

(73) Assignee: MAN Roland Druckmaschinen AG, Offenbach am Main (DE)

( * ) Notice: Subject to any disclaimer, the term of this patent is extended or adjusted under 35 U.S.C. 154(b) by 707 days.

(21) Appl. No.: 11/893,681

(22) Filed: Aug. 16, 2007

(65) Prior Publication Data

US 2008/0062419 A1 Mar. 13, 2008

(30) Foreign Application Priority Data

Aug. 16, 2006 (DE) ....................... 10 2006 038 200

(51) Int. Cl.
*G01J 11/00* (2006.01)
*G01J 3/46* (2006.01)

(52) U.S. Cl. ....................... 356/402; 356/407; 356/408; 356/425

(58) Field of Classification Search ......... 356/399–402, 356/407, 421, 422, 423, 424, 425; 101/365, 101/211, 171, 364; 345/150, 153, 207
See application file for complete search history.

(56) References Cited

U.S. PATENT DOCUMENTS

| | | | | |
|---|---|---|---|---|
| 5,182,721 | A * | 1/1993 | Kipphan et al. | 382/112 |
| 5,396,060 | A * | 3/1995 | Devenyi et al. | 250/214.1 |
| 5,604,586 | A * | 2/1997 | Bahr et al. | 356/244 |
| 5,767,980 | A * | 6/1998 | Wang et al. | 358/475 |
| 5,791,781 | A * | 8/1998 | Park et al. | 374/159 |
| 5,805,280 | A * | 9/1998 | Lasken et al. | 356/244 |
| 6,041,708 | A * | 3/2000 | Kipphan et al. | 101/365 |
| 6,437,865 | B1 * | 8/2002 | Willing | 356/402 |
| 6,559,826 | B1 * | 5/2003 | Mendelson et al. | 345/102 |
| 7,218,358 | B2 * | 5/2007 | Chen et al. | 348/658 |
| 7,352,488 | B2 * | 4/2008 | Ben-Chorin et al. | 358/1.9 |
| 7,388,656 | B2 * | 6/2008 | Liu | 356/30 |
| 2004/0168601 | A1 | 9/2004 | Petermann | |
| 2005/0168700 | A1 | 8/2005 | Berg et al. | |

FOREIGN PATENT DOCUMENTS

| | | |
|---|---|---|
| DE | 250 295 | 10/1987 |

(Continued)

OTHER PUBLICATIONS

Search Report dated Feb. 22, 2007 issued for the corresponding German Application No. 10 2006 038 200.5.

*Primary Examiner*—Sang Nguyen
(74) *Attorney, Agent, or Firm*—Cohen Pontani Lieberman & Pavane LLP

(57) ABSTRACT

A control station for a printing press, includes at least one true color monitor for displaying at least one soft proof serving as a color reference for printed copies printed during the printing process, and at least one standard light source for at least partial illuminating the control station to allow visual comparison, independent of room lighting, of a printed copy with the soft proof serving as the color reference. The luminosity produced by the at least one standard light source is variable, so that the luminosity produced by the at least one standard light source can be adjusted to match a brightness achievable on the true color monitor to match a contrast achievable on the true color monitor during the display of the soft proof.

8 Claims, 2 Drawing Sheets

FOREIGN PATENT DOCUMENTS

| | | |
|---|---|---|
| DE | 41 32 754 | 4/1992 |
| DE | 44 01 534 | 3/1995 |
| DE | 44 13 230 | 10/1995 |
| DE | 196 45 005 | 5/1997 |
| DE | 199 39 154 | 4/2001 |
| DE | 101 21 984 | 11/2002 |
| DE | 103 53 868 | 6/2004 |
| DE | 10 2004 022 828 | 12/2004 |
| DE | 10 2005 001 417 | 8/2005 |
| EP | 0 749 833 | 12/1996 |
| EP | 1 607 220 | 12/2005 |
| JP | 2001-353852 | 12/2001 |

* cited by examiner

CONTROL STATION FOR A PRINTING PRESS

BACKGROUND OF THE INVENTION

1. Field of the Invention

The invention relates to a control station for a printing press.

2. Description of the Related Art

In practice, a reference pattern prepared on a color ink-jet printer is generally used as a color reference during the fulfillment of a printing order on a printing press, such as on a web-fed rotary press or on a sheet-fed press, where the press operator compares the copies printed on the printing press with this reference pattern. Such reference patterns printed on a color ink-jet printer are also called "hard proofs". So that a visual comparison can be made between the printed copies and the hard proof serving as a color reference independently of the room lighting, the control station is provided with at least one standard light source, by means of which the control station can be at least partially illuminated.

It is also known according to the prior art that, in addition to or in replacement of the reference pattern prepared on the color ink-jet printer, the color reference can be displayed on a true color monitor. The display of a color reference on a true color monitor is also referred to as a "soft proof". It is difficult, however, to make a reliable visual comparison between the printed copy and the soft proof serving as the color reference at the printing press control stations known in practice, because the range over which the brightness and/or contrast of true color monitors can be adjusted is limited.

SUMMARY OF THE INVENTION

An object of the present invention is to provide a control station for a printing press, where soft proofs can be visually compared reliably with printed copies.

This object is met by a control station described herein. According to an embodiment of the invention, the luminosity produced by the standard light source or by each such source is variable, so that the luminosity produced by the standard light source or by each such source can be matched to the brightness which can be produced on at least one true color monitor and/or to a contrast achievable on each of the at least one true color monitor during the display of the soft proof. As a result, soft proofs can also be visually compared reliably with printed copies.

According to a further embodiment of the invention, the control station comprises at least one blind or shade, installed between the standard light source or each such source and each of the at least one true color monitor to adjust the incidence of the standard light on the at least one true color monitor or on each such monitor.

According to another embodiment of the invention, the control station comprises at least one device for shielding the at least one true color monitor from the incidence of stray light, especially that of the room lighting. This device can be designed to be adjustable, preferably by means of an electric motor.

The control station preferably comprises an open-loop and/or closed-loop control unit for storing, in the control station, the values of the luminosity produced by the standard light source or by each such source and/or the setting of the blind or shade or of each blind or shade used to influence the incidence of standard light on the at least one true color monitor and/or the setting of the device or of each device used to influence the incidence of stray light and for manually or automatically controlling the luminosity values and settings, where it is possible to call up predefined luminosity values and settings.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, like reference characters refer to the same parts throughout the different views. Also, the drawings are not necessarily to scale, emphasis instead generally being placed upon illustrating the principles of the invention.

DETAILED DESCRIPTION OF THE PRESENTLY PREFERRED EMBODIMENTS

Figure 1:
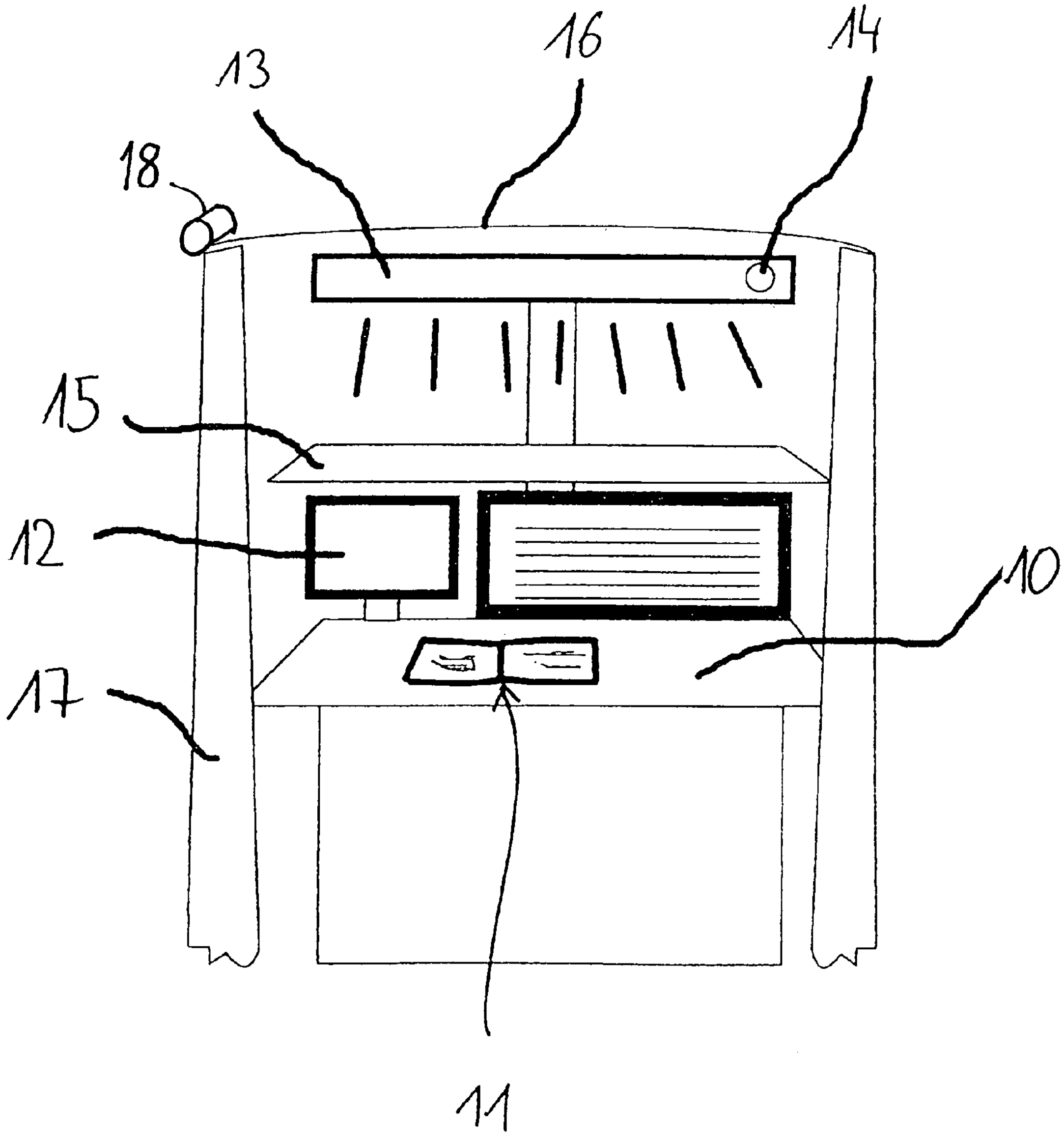
FIG. 1 shows a schematic diagram of an inventive control station for a printing press.

FIG. 1 shows a schematic diagram of a control station for a printing press. The control station according to FIG. 1 includes a control station desk 10, on which a printed copy 11 printed on a printing press is placed. The control station also includes a true color monitor 12 assigned to the control station desk 10, on which a color reference for the printed copies can be displayed. This color reference for the printed copies displayed on the true color monitor 12 is also referred to as a "soft proof". This soft proof displays, as a color reference, one or more printed pages as a whole or in sections.

So that a visual comparison between a printed copy 11 and a soft proof displayed as a color reference on a true color monitor 12 can be made independently of the room lighting, the control station has a standard light source 13, by means of which the control station can be at least partially illuminated.

In accordance with the present invention, the luminosity or light intensity produced by the standard light source 13 of the control station shown in FIG. 1 can be varied in order to adjust the luminosity or light intensity produced by the standard light source 13 to a brightness achievable on the true color monitor 12 and to a contrast achievable on the true color monitor during the display of the soft proof.

As a result, it can be guaranteed that a printed copy can be reliably matched or compared with a soft proof displayed on a true color monitor at a control station.

In the preferred exemplary embodiment, the luminosity or light intensity of the standard light source 13 can be varied directly by a dimmer 14 that is assigned to the standard light source 13 according to FIG. 1. By the use of the dimmer 14, the luminosity or light intensity of the standard light source 13 can be changed and thus adjusted as necessary.

Figure 3:
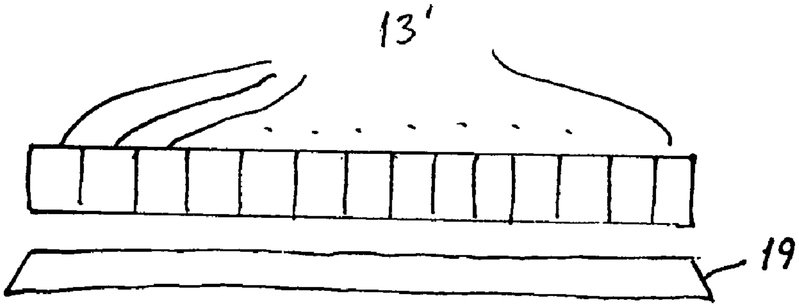
FIG. 3 is another embodiment of a light source for the control station of FIG. 1.

It is also possible to use a plurality of standard light sources 13' at a control station and change the luminosity or light intensity produced by the standard light sources by turning on different numbers of the standard light sources (see FIG. 3).

FIG. 3 illustrates that to change the luminosity or light intensity produced by the standard light source or by each such source, furthermore, it is possible to provide the standard light source 13 (or each light source 13') with a device 19 which at least partially absorbs the standard light emitted by the standard light source in question. Because at least one such device 19 is selectively placed in front of at least one standard light source, the luminosity produced by the standard light source or by each such source can be adjusted.

The inventive control station shown in FIG. 1 also includes a blind or shade 15, which is placed between the standard light source 13 and the true color monitor 12 to adjust the incidence of standard light on the true color monitor 12 individually.

As a result, it is possible to adjust with precision the luminosity or light intensity of the standard light in the immediate area affected by the true color monitor 12. The shade 15 can for this purpose be shifted in a horizontal plane and/or rotated relative to the true color monitor 12.

The inventive control station also has a device for shielding at least the true color monitor 12 from the incidence of stray light of the room lighting. In the exemplary embodiment shown, this device is designed as a curtain 17, which is guided along a rail 16 and which can be moved by an electric motor 18. This curtain can shield the entire control station from the incidence of stray light from different directions. Thus, the curtain 17 shown in FIG. 1 shields the entire control station from the incidence of stray light from the rear and from both sides. If necessary, the curtain 17 can also be completely closed to shield the control station from the incidence of stray light from the front as well. The incidence of stray light from above could also be prevented, if desired, by a blind (not shown) placed over the top of the control station.

Figure 2:
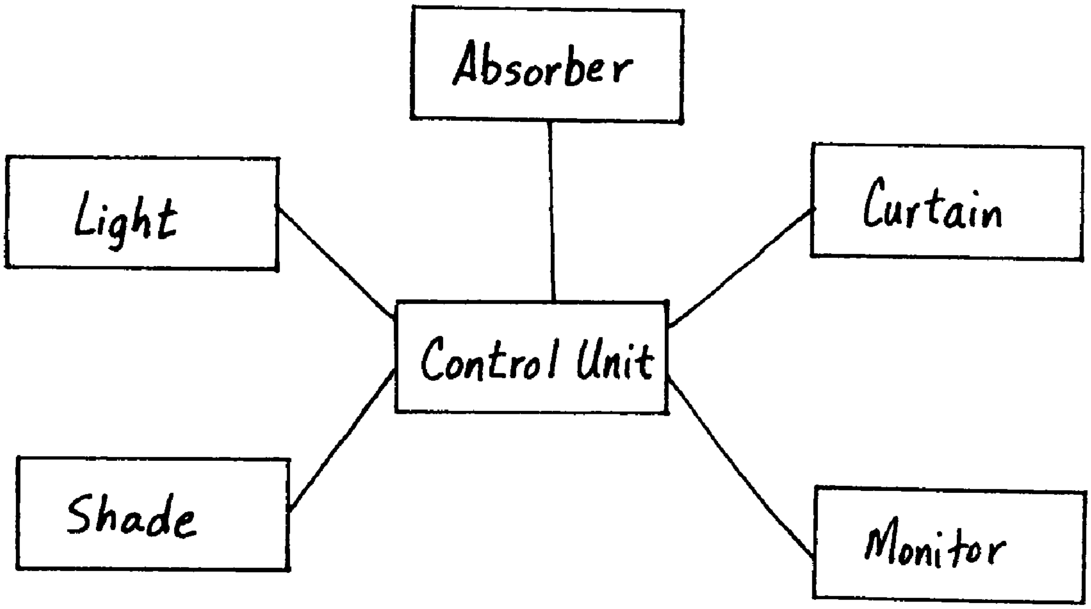
FIG. 2 is a block diagram of the control station of FIG. 1.

Especially preferred is a control station which comprises an open-loop and closed-loop control unit 20 (see FIG. 2) for storing the values of the luminosity or light intensity produced by the standard light source 13, the setting of the shade 15 used to influence the incidence of standard light on the true color monitor 12, and the setting of the curtain 17 used to influence the incidence of stray light on the control station. This control unit is also used manually or automatically to control these parameters as a function of the stored luminosity values and settings. As a result, it is possible, for example, to switch an inventive control station into "color matching mode" at the push of a button, so that, for example, the luminosity or light intensity of the standard light source 13 and the position of the curtain 17 are set at defined target values, which automatically ensures the optimum control station conditions required for visual comparison of printed copies with soft proofs.

Variations, modifications, and other implementations of what is described herein may occur to those of ordinary skill in the art without departing from the spirit and scope of the invention. Accordingly, the invention is not to be defined only by the preceding illustrative description.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A control station for a printing press comprising:

at least one true color monitor displaying at least one soft proof serving as a color reference for printed copies printed during the printing process;

at least one standard light source radiating standard light at least partial illuminating the control station to allow visual comparison, independent of room lighting, of a printed copy with the soft proof serving as the color reference;

wherein the luminosity produced by the at least one standard light source is variable, so that the luminosity produced by the at least one standard light source is adjustable to match a brightness achievable on the true color monitor and to match a contrast achievable on the true color monitor during the display of the soft proof; and an open-loop or closed-loop control unit for storing values of the luminosity produced by the standard light source used to influence the incidence of standard light on the true color monitor, the setting of a blind or shade used to influence the incidence of standard light on the true color monitor, or the setting of a device used to influence the incidence of stray light on the control station, and for manually or automatically controlling the luminosity values and the settings, wherein predefined settings and luminosity values are accessed from the open-loop or closed-loop control unit.

2. The control station according to claim 1, wherein the luminosity of each of the at least one standard light source is variable.

3. The control station according to claim 1, wherein the at least one standard light source comprises a plurality of additional at least one standard light sources and the number of standard light sources which can be turned on is variable.

4. The control station according to claim 1, further comprising at least one blind or shade disposed between the at least one standard light source and the true color monitor to adjust the incidence of the at least standard light on the true color monitor.

5. The control station according to claim 1, further comprising at least one device shielding at least the true color monitor from the incidence of stray light.

6. The control station according to claim 5, wherein the at least one device is moved by an electric motor to shield the entire control station from the incidence of stray light.

7. The control station according to claim 1, further comprising at least one standard light-absorbing device which is assigned to the standard light source, and is selectively disposed in front of the at least one standard light source to change the luminosity produced by the at least one standard light source.

8. A control station for a printing press comprising:

at least one true color monitor displaying at least one soft proof serving as a color reference for printed copies printed during the printing process;

at least one standard light source radiating standard light at least partial illuminating the control station to allow visual comparison, independent of room lighting, of a printed copy with the soft proof serving as the color reference;

wherein the luminosity produced by the at least one standard light source is variable, so that the luminosity produced by the at least one standard light source is adjustable to match a brightness achievable on the true color monitor and to match a contrast achievable on the true color monitor during the display of the soft proof; and at least one standard light-absorbing device which is assigned to the standard light source, and is selectively disposed in front of the at least one standard light source to change the luminosity produced by the at least one standard light source.

* * * * *